(12) United States Patent
Yamanaka et al.

(10) Patent No.: US 7,835,256 B2
(45) Date of Patent: Nov. 16, 2010

(54) TWO-LAYER OPTICAL DISK AND RECORDING/REPRODUCING OPTICAL DISK APPARATUS OF THE TWO-LAYER OPTICAL DISK

(75) Inventors: Yutaka Yamanaka, Tokyo (JP); Shuichi Ohkubo, Tokyo (JP); Kazuo Watabe, Kanagawa (JP); Yutaka Kashihara, Kanagawa (JP); Akihito Ogawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 1072 days.

(21) Appl. No.: 11/519,527

(22) Filed: Sep. 12, 2006

(65) Prior Publication Data

US 2007/0071936 A1    Mar. 29, 2007

(30) Foreign Application Priority Data

Sep. 12, 2005    (JP) .............................. 2005-263714

(51) Int. Cl.
*G11B 7/24*    (2006.01)
(52) U.S. Cl. .................................. 369/275.3; 369/47.53
(58) Field of Classification Search ........................ None
See application file for complete search history.

(56) References Cited

U.S. PATENT DOCUMENTS

2001/0033543 A1* 10/2001 Akiyama et al. ......... 369/275.4
2002/0031063 A1* 3/2002 Kojima ..................... 369/47.11
2003/0185121 A1* 10/2003 Narumi et al. ........... 369/47.53
2005/0013222 A1* 1/2005 Lee et al. .................. 369/47.51

FOREIGN PATENT DOCUMENTS

| EP | 1 187 112 A | 3/2002 |
|---|---|---|
| EP | 1 258 868 A | 11/2002 |
| EP | 1 467 356 A | 10/2004 |
| EP | 1 752 976 A | 2/2007 |
| JP | 10-026957 | 1/1998 |
| JP | 2007-048409 | 2/2007 |
| WO | WO 02/23542 A1 | 3/2002 |
| WO | WO2004/114289 A1 | 12/2004 |

* cited by examiner

*Primary Examiner*—Christopher R Lamb
(74) *Attorney, Agent, or Firm*—Scully, Scott, Murphy & Presser, P.C.

(57) ABSTRACT

A two-layer recording type optical disk capable of realizing stable recording and reproduction without being affected by another recording layer and an optical disk apparatus for the two-layer recording type optical disk are provided. In layouts of various areas in the optical disk, a position where a border between a recorded part and an unrecorded part is formed on one recording layer is set so that the position is always separated from a position where a border between a recorded part and an unrecorded part is formed on another recording layer by a predetermined clearance amount. Moreover, to a recording layer farther from an incident surface, test recording or data recording is always performed through a recorded part on a closer recording layer.

3 Claims, 8 Drawing Sheets

TWO-LAYER OPTICAL DISK AND RECORDING/REPRODUCING OPTICAL DISK APPARATUS OF THE TWO-LAYER OPTICAL DISK

This application claims priority to prior Japanese patent application JP 2005-263714, the disclosure of which is incorporated herein by reference.

BACKGROUND OF THE INVENTION

1. Field of the Invention

The present invention relates to a recording/reproducing optical disk apparatus (recording type optical disk apparatus) for recording or reproducing data by a very small optical spot and a two-layer optical disk used with the recording type optical disk apparatus.

2. Description of the Related Art

In the field of optical disks which record or reproduce data by a very small optical spot, in addition to reproduction only optical disk ROM (Read Only Memory) media on which embossed data pit arrays are formed in advance, CD-Rs (Compact Disc-Recordable) and DVD-Rs (Digital Versatile Disc-Recordable), which are optical disks capable of recording data, have been widely used. Also, CD-RWs (CD-Re-Writable) and DVD-RWs (DVD-ReWritable), which can rewrite recorded data, have been used. Moreover, as a next-generation DVD, an optical disk format referred to as an HD DVD-R which can record using a blue light source have been developed. In this description, the optical disks which can record or rewrite data are generically referred to as recording type optical disks.

On the recording type optical disks, a spiral groove track (or a pre-groove) for tracking is formed on an optical disk substrate, and a recording layer composed of multilayer films including an organic material are formed on the optical disk substrate with the spiral groove track. Date is recorded by forming recording pits by condensing a high-power laser beam on the recording layer and partially transforming the recording layer. After the recording, because a servo signal which has similar characteristics to a ROM medium on which embossed data pit arrays are formed can be obtained with a same data format as the ROM medium, it has the advantage that reproduction can be readily performed by a reproduction only driving device.

Further, recently, in such recording type optical disks, optical disk media which realize increase of recording capacity by forming two recording layers and recording or reproducing from a same substrate incident surface have been developed and manufactured. For example, in the DVD-Rs, such two-layer media have been manufactured.

In the reproduction only ROM media, also in the DVD-Rs, the two-layer optical disks have already been widely manufactured. However, in order to allow the recording optical disks to have the two layers, it is necessary to solve their peculiar problems.

Particularly, as shown in FIG. 7, the two-layer optical disk has two recording layers referred to as a zeroth recording layer and a first recording layer. Access to the two recording layers by a laser beam is performed from an incident surface 4 respectively. When a recording is performed to the first recording layer which is relatively far from the incident surface 4, the condensed beam always penetrates the zeroth recording layer. Then, in an unrecorded part 5 and a recorded part 6 of the zeroth recording layer, generally, transmittances are different form each other. Accordingly, if a recording operation is performed to the first recording layer across the recorded pert and the unrecorded part of the zeroth layer, the power of the condensed beam to be reached to the first recording layer is changed during the recording, comes off the optimal condition, and it is difficult to record in a good condition.

To solve this problem, a method that after all of the first recording layer is recorded, a recording on the zeroth recording layer is performed so that the recording on the first recording layer is performed always under the same condition has been described in Japanese Unexamined Patent Application Publication No. 10-26957.

Further, for a two-layer medium of the DVD-R, a format when a data recording is performed onto the first recording layer, the recording is performed through a part of the zeroth recording layer where is in a recorded state has been established.

In the method that the recording on the zeroth recording layer is performed after all of the first recording layer is recorded, a control data recording area for recording control which is generally provided in an inner circumferential part of the disk has to be provided to each of the two recording layers respectively, and the processing is complicated. Moreover, recording state of the overall two-layer optical disk cannot be checked by just reproducing the control data recording area of one of the recording layers.

When data is recorded onto the first recording layer, in the format that the recording is always performed through the recorded part of the zeroth recording layer, in a test zone for optimizing and checking a recording condition set to an inner circumference part or an outer circumference part of the optical disk, because the corresponding zeroth recording layer is not always recorded, an optimum recording condition in the recorded part has to be estimated using the optimum recording condition checked by test recording in the unrecorded state.

Moreover, if an interval between the two recording layers becomes narrow, other problem described below occurs.

That is, as shown in FIG. 8, a recording or reproducing is performed on one recording layer by condensing a laser beam (shown by a solid line), reflection from another recording layer returns to the optical head which is used for recording or reproducing as coherent light (shown by a dotted line). In FIG. 8, in the right-hand side, a case in which the laser beam is condensed on the zeroth recording layer is shown and in substantially center and left-hand side, a case in which the laser beam is condensed on the first recording layer is shown.

When the laser beam is condensed on the zeroth recording layer, the coherent light from the first recording layer becomes to the same reflected light as in the case in which a virtual condensing point appears at back side twice far of the interval between the recording layers, and when the laser beam is condensed on the first recording layer, the coherent light from the zeroth recording layer becomes to the same reflected light as in the case in which a virtual condensing point appears at front side twice far of the interval between the recording layers.

If the interval between the recording layers is wide, because these coherent lights can be considered as reflected lights from the virtual condensing points largely displaced from the actual condensing points, a percentage of the coherent lights which reaches a photodetector in the optical head is small and substantially, there is no problem. However, if the interval between the recording layers becomes narrow and an amount of the coherent light reaches the photodetector becomes to a considerable level, problems occur. A salient problem is the two positions of the condensed beams shown in the right-hand side of the drawing in a case in which the reflected lights are generated at the border parts between the recorded part 6 and the unrecorded part 5. In this case, imbalance of optical power is generated in the coherent light. In the optical head for the recording type optical disk, a push-pull method in which imbalance in the cross section of the reflected light generated from a pre-groove is detected to be a track error signal is employed. Accordingly, if an imbalanced coherent light is received by the optical head, the possibility to be an offset of the track error signal is high. If such offset amount becomes significant, not only the recording operation but also the reproduction operation cannot be stably realized.

Such imbalance of the coherent light can be generated not only at the border between the recorded part and the unrecorded part but as the position of the condensed beam in the left-hand side in the drawing, at the border between a reproduction only pit area 3 which is often provided on an optical disk inner circumference part for control information recording and the unrecorded area 5.

As described above, the known recording type optical disk has the problem that the recording processing on the control data recording area is complicated and in order to know a recording state, it is necessary to access to the control data recording areas of the two recording layers. In addition, other known recording type optical disks have the problem that the optimum recording condition has to be estimated. Moreover, the known recording optical disks has the problem that the narrower the interval between the recording layers becomes, the more affected by the coherent light.

SUMMARY OF THE INVENTION

Accordingly, it is an object of the present invention to provide an optical disk and an optical disk apparatus which reduces the above-described problems.

According to one aspect of the present invention, a two-layer optical disk has two layers of recording layer on which a recordable spiral track is formed and recording or reproduction is performed through a transparent substrate from a same incident surface, from an inner circumference side to an outer circumference side of each recording layer, a track is divided in an inner circumference control data recording area, an user data recording area, and an outer circumference control data recording area, and each of the inner circumference control data recording area and the outer circumference control data recording area has a test zone for checking a recording condition within the area respectively. The two-layer optical disk has a guard zone which has address set positions of an inner circumference end and an outer circumference end separated greater or equal to a predetermined clearance value on the inner circumference side and the outer circumference side from address positions of an inner circumference end and an outer circumference end of each test zone on a different recording layer from the recording layer on which the test zone exists.

According to another aspect of the present invention, in the two-layer optical disk, the guard zone is an area on which dummy data is recorded or an area on which recording data is not formed, and the guard zone set on a recording layer closer to the incident surface is an area for recording dummy data.

According to yet another aspect of the present invention, a two-layer optical disk has two layers of recording layer on which a recordable spiral track is formed and recording or reproduction is performed through a transparent substrate from a same incident surface, and from an inner circumference side to an outer circumference side of each recording layer, a track is divided in a reproduction only pit area, an unrecorded area, an inner circumference control data recording area, and an user data recording area. Two border set address positions of a border (border A) between the unrecorded area and the inner circumference control data recording area and a border (border B) between the inner circumference control data recording area and the user data recording area on each recording layer are set to address positions separated grater or equal to a predetermined clearance value on the inner circumference side or the outer circumference side against three border set address positions of a border (border C) between the reproduction only pit area and the unrecorded area, the border A and the border B on a different recording layer.

According to still yet another aspect of the present invention, in the two-layer optical disk, an interval between the two layers of recording layer is less than 40 μm and a NA of an optical head for recording data on the optical disk or reproducing the data from the optical disk is less or equal to 0.65.

According to still yet another aspect of the present invention, a recording/reproducing optical disk apparatus is for recording or reproducing an optical disk having two layers of recording layer on which a recordable spiral track is formed and recording or reproduction is performed through a transparent substrate from a same incident surface. A recording operation or a reproducing operation on each recording layer is performed by distinguishing whether an address is within or without a predetermined clearance value against an address position of a border between a recorded part and an unrecorded part formed on a different recording layer.

According to still yet another aspect of the present invention, a two-layer optical disk has two layers of recording layer on which a test zone for checking a recording condition is provided. A guard zone is provided on one of the recording layers so as to correspond to the test zone provided on another recording layer and an inner circumference end of the guard zone is arranged on more inner circumference side than an inner circumference end of the test zone by greater or equal to a predetermined clearance value and an outer circumference end of the guard zone is arranged on more outer circumference side than an outer circumference end of the test zone by greater or equal to the predetermined clearance value.

According to the present invention, in the two-layer recording type optical disk which has a narrow interval between recording layers, stable recording and reproduction can be realized.

DESCRIPTION OF THE PREFERRED EMBODIMENTS

With reference to the following attached drawings, an optical disk and an optical disk apparatus according to the present invention are described.

Figure 1:
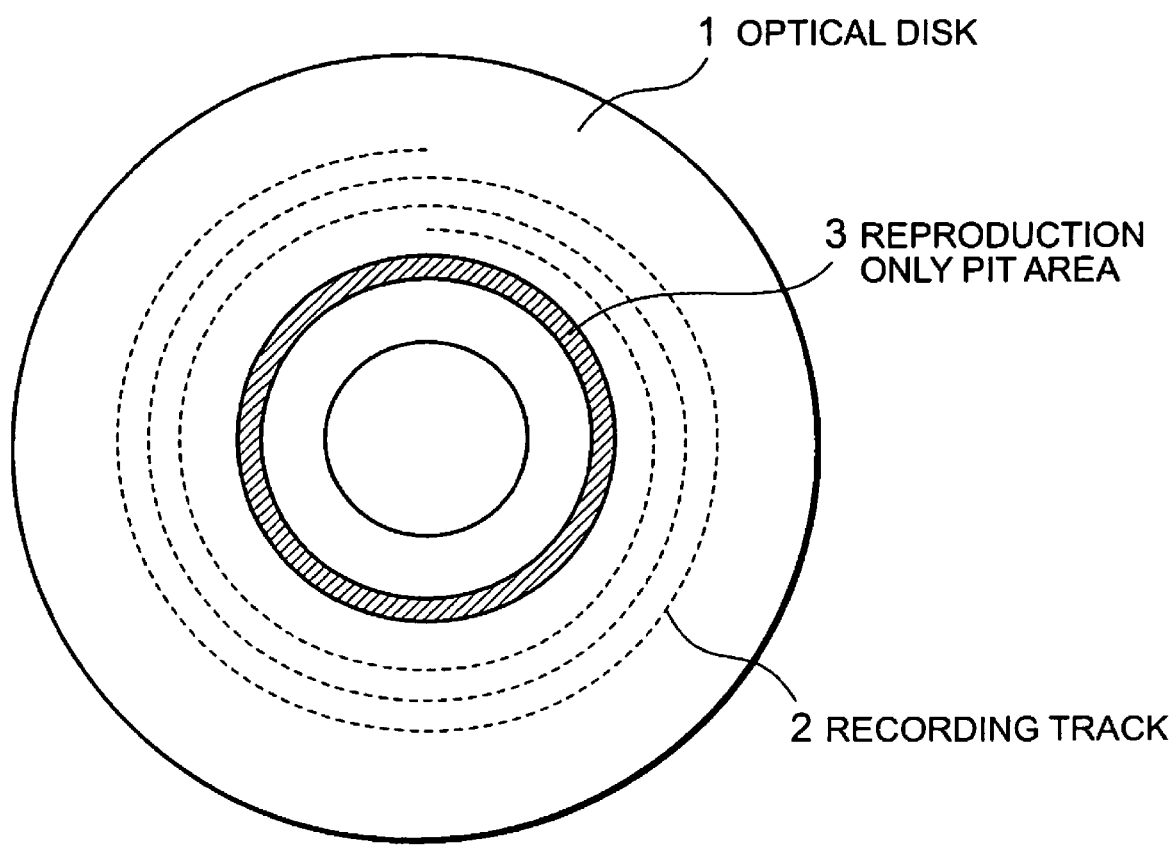
FIG. 1 is a plan view illustrating a recording type optical disk to which the present invention is applied.

FIG. 1 is a view illustrating an example of an optical disk to which the present invention is applied. On an optical disk 1, a spiral recording track 2 is formed. In an inner circumference area of the recording track 2, a reproduction only pit area 3 can be formed. Two recording layers which have such a recording track are formed in a vertical direction to the surface in the drawing, and surfaces are referred to as a zeroth recording layer and a first recording layer in order from closer side to the incident surface. In the two-layer recording type optical disk, often a recording format is used that a recording is performed from the inner circumference side to the outer circumference side of the zeroth recording layer and in the first recording layer, a recording is performed from the outer circumference side to the inner circumference side. However, the present invention is not limited to the format, and the recording direction can differ from the format.

The biggest feature of the present invention is that a recording on one recording layer or reproduction of one recording layer is performed by avoiding the border between a recorded part and an unrecorded part of another layer (hereinafter, simply referred to as a border). Thus, it is required to calculate a relative accuracy of address positions of the two recording layers and determine a certain clearance value necessary to prevent affection from the border of one recording layer.

The recording track on each recording layer is divided into units of a predetermined length and a specific address is given to each unit. According to the design, the center of the recording track of the zeroth recording layer and the center of the recording track of the first recording layer correspond with each other and the same address is given to track areas whose distances from the centers are equal in the two recording layers. Thus, firstly, relative difference between the track position of the zeroth recording layer and the track position of the first recording layer which should be the same address according to the design is estimated to find out how much degree the relative differ is on the actual optical disk.

Figure 2:
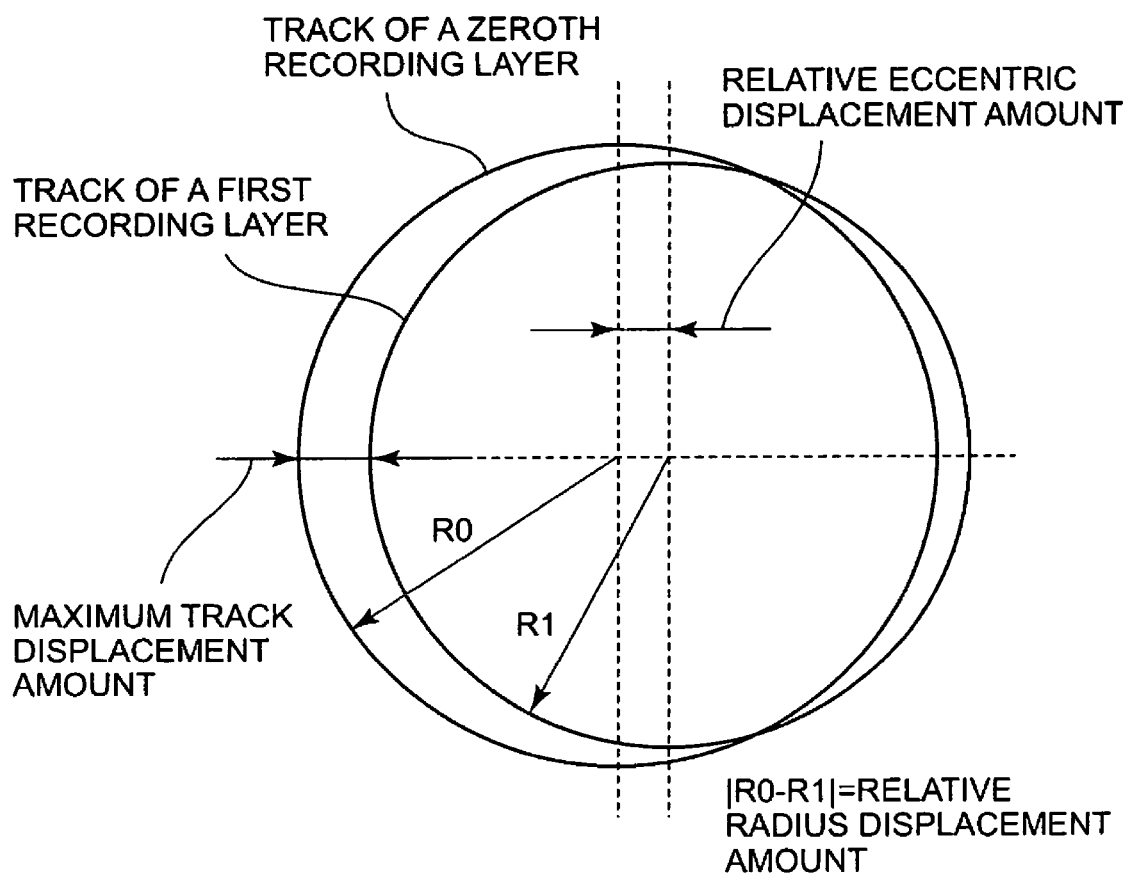
FIG. 2 is a view for explaining a principle of the present invention.

FIG. 2 is a view illustrating an example of a relation between the track of the zeroth recording layer and the track of the first recording layer which have the same address (to be the same radius) according to the design. A first factor for determining the predetermined clearance value is a relative displacement amount of the track radius $|R0-R1|=Rr$ which is supposed to be the same. The relative displacement amount Rr is calculated from a manufacturing accuracy, for example, the value is about 40 μm.

A second factor to determine the predetermined clearance value is eccentricity. In the two-layer optical disk, a different allowable upper limit of eccentric amount is often set to each recording layer. For example, the upper limit of the zeroth recording layer is 40 μmp-p and the upper limit of the first recording layer is 60 μmp-p. In this case, a maximum relative eccentric displacement amount Re between the tracks of the two recording layers is $(40+60)/2=50$ μm. Accordingly, in the above examples of the numeric values, the maximum displacement amount in the radius direction between two tracks is 90 μm.

Figure 8:
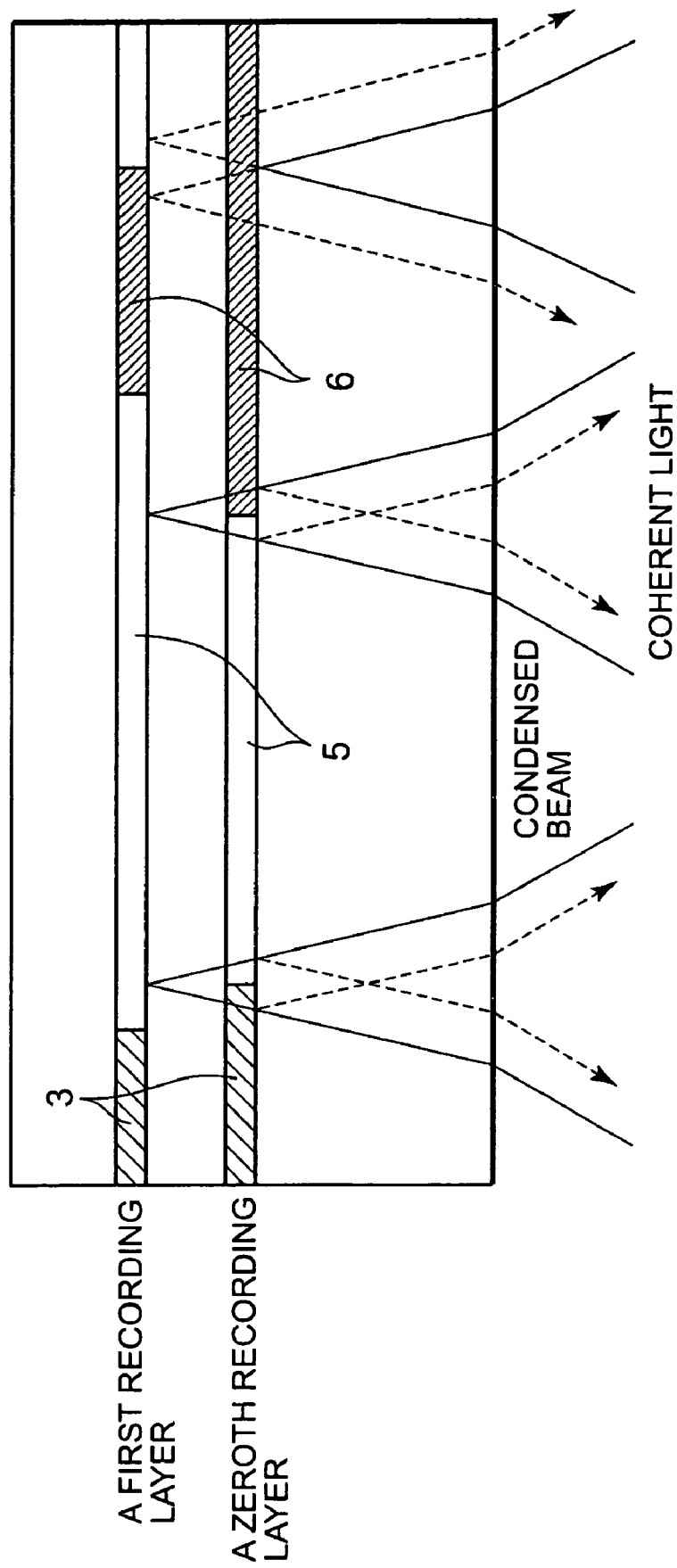
FIG. 8 is a view for explaining other problem of a known two-layer optical disk.

Then, a radius Rb of a reflected light (coherent light) at a surface of one recording layer in a case in which a light is condensed on another recording layer (in FIG. 8, if a laser beam is condensed on the zeroth recording layer, the under surface of the first recording layer, and if the laser beam is condensed on the first recording layer, the under surface of the zeroth recording layer) is estimated. For example, if it is given that an interval between the recording layers is 30 μm, a numerical aperture NA of the condensed beam is 0.65, and a refractive index of a material between the recording layers is 1.5, Rb=about 15 μm. However, actually, effect to a detection signal is small when the peripheral part of the condensed beam which has a cross section of round shape covers on a border part of another recording layer and it is experimentally confirmed that it is enough to consider from about two thirds of a theoretical radius. Accordingly, in this numeric value example, the radius Rb is 10 μm.

In the end, the sum of the three values, $Rr+Re+Rb$ is the predetermined clearance and in the above numeric value example, the value is 100 μm. That is, when the border of one recording layer is at an address, if an address is separated greater or equal to the clearance value=100 μm in a direction of the inner circumference or the outer circumference, the effect from the border on another recording layer can be ignored.

Effect of a coherent light from one recording layer in a case in which a condensed beam is formed on another recording layer becomes more significant as the interval between the recording layers becomes narrower. This is because a focus of the condensed beam and an apparent condensing point of the coherent light approach with each other. Moreover, because even if the interval between the recording layers is the same, if a spread angle of the condensed beam is small, that is, as a numerical aperture NA of the lens to be condensed becomes smaller, an amount of a coherent light to be taken by the optical head increases, the effect increases.

Figure 3:
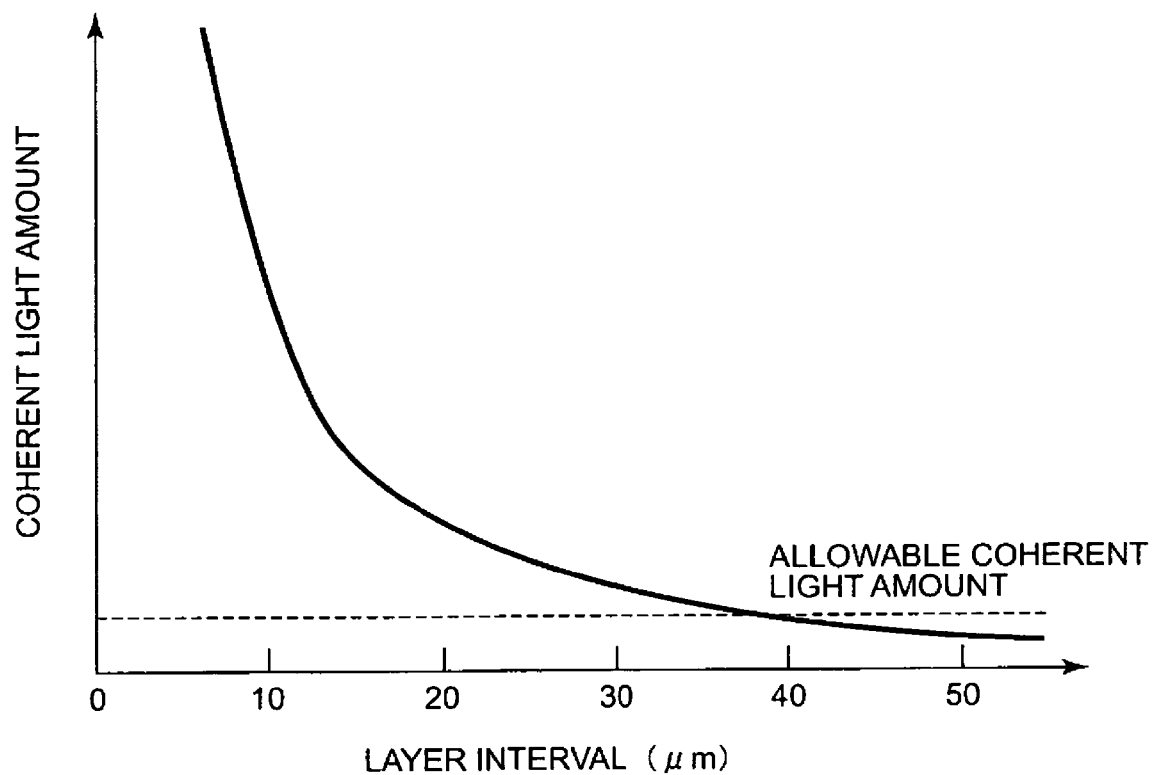
FIG. 3 is a graph illustrating a measured result of relation between a recording layer interval and a coherent light amount.

In FIG. 3, a coherent light amount to be detected is actually measured with an optical head of a general condition that a size of a light reception part of a photodetector in the optical head which receives a reflected light from an optical disk corresponds to 10×10 μm converted as a condensing point of the condensed beam on the optical disk. The NA of the condenser lens is 0.65. If the layer interval becomes smaller than 40 μm, the amount of the coherent light to be detected exceeds an allowable coherent light amount. The allowable coherent light amount denotes a condition that no significant change can be found on a track error signal. The reflection coefficient of the layer which generates the coherent light is twice as large as the reflection coefficient of the layer on which the focus exists. The reflection coefficient difference is the maximum value allowed in a general format of the two-layer optical disk.

As a result, in the optical disk which has the recording layer interval of less or equal to 40 μm, the coherent light from the border cannot be ignored. In the present invention, by employing the above-described clearance value, the effect of the sizes of the recording layer interval can be reduced. Moreover, if the numerical aperture NA of the condenser lens becomes smaller, the coherent light amount tends to increase as a whole. However, by the same reason, the effect of the sizes of the numerical aperture NA of the condenser lens can be reduced. Accordingly, the present invention is effective to the optical disks which have the recording layer interval of less or equal to 40 μm. The present invention is also effective to the system of less or equal to NA 0.65.

Figure 4:
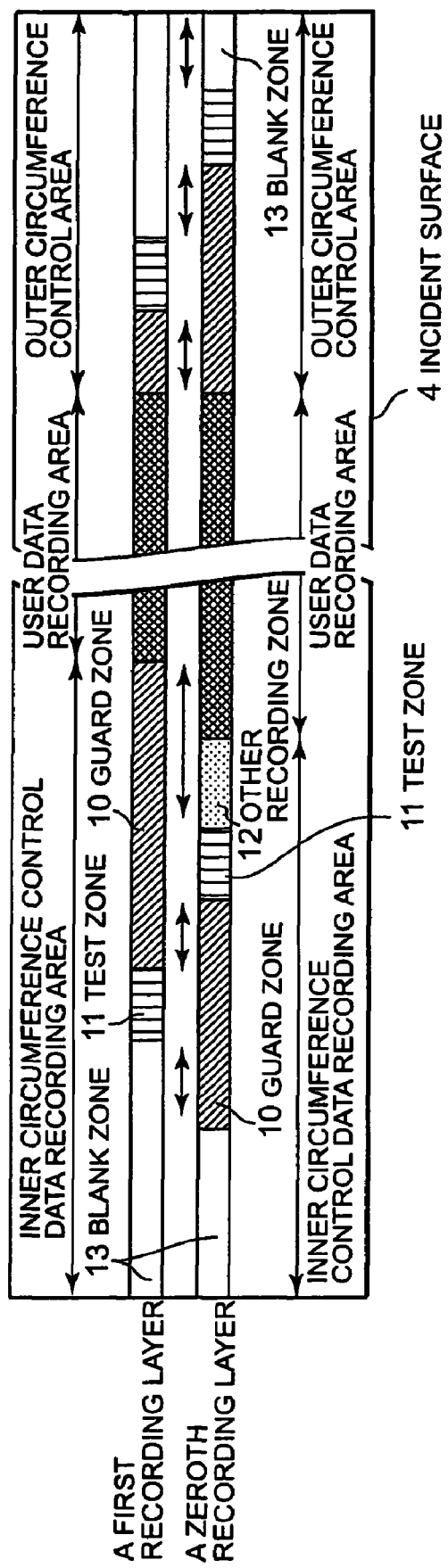
FIG. 4 is a view illustrating an example of format of an optical disk according to a first embodiment of the present invention.

With reference to FIG. 4, an example of a format arrangement of an optical disk according to a first embodiment of the present invention is described. In FIG. 4, the left-hand side is an inner circumference side of the optical disk and the right-hand side is an outer circumference side of the optical disk.

In each recording layer, from the inner circumference side, it is divided into an inner circumference control data recording area, a user data recording area, and an outer circumference control data recording area.

The inner circumference control data recording area of the zeroth recording layer has a blank zone 13, a guard zone 10, a test zone 11, and another recording zone 12. The other recording zone 12 has a part for appropriately recording control information about address position under recording or the like. The inner circumference control data recording area of the first recording layer has the blank zone 13, the test zone 11, and the guard zone 10.

The outer circumference control data recording area of the zeroth recording layer has the guard zone 10, the test zone 11, and the blank zone 13. The outer circumference control data recording area of the first recording layer has the guard zone 10, the test zone 11, and the blank zone 13. The guard zone 10 is an area for recording dummy data and the blank zone 13 is an area where no recording is performed. The guard zone 10 is in common with the blank zone 13 that the guard zone 10 and the blank zone 13 have no border between a recorded part and an unrecorded part. Accordingly, the blank zone 13 can be considered as a kind of the guard zones.

In the above arrangement, at a position of one recording layer corresponding to a position of another recording layer where the test zone 11 is provided, the guard zone 10 or the blank zone 13 which is wider than the test zone 11 is always provided. That is, the inner circumference end of the guard zone 10 or the blank zone 13 corresponding to each test zone 11 is arranged at an inner side greater or equal to the above-described predetermined clearance value than the inner circumference end of the corresponding test zone. Moreover, the outer circumference end of the guard zone 10 or the blank zone 13 corresponding to each test zone 11 is arranged at an outer side greater or equal to the above-described predetermined clearance value than the outer circumference end of the corresponding test zone. Two-way allows between the two recording layers shown in the drawing denote distances longer than the predetermined clearance value against the test zone 11.

According to the recording format shown in FIG. 4, even if any test zone in the zeroth recording layer and the first recording layer is used, it is possible to operate without effect of the border between the recorded part and the unrecorded part of another recording layer.

Further, before the test zone 11 of the first recording layer is used, if a recording onto the guard zone 10 of the zeroth recording layer is finished, it is possible to optimize the recording condition through the recorded zeroth recording layer. That is, when a recording is performed onto the user data recording area, if the recording on the first recording layer is performed after the recording onto the zeroth recording layer is finished, a test under the same condition as in the case of recording onto the user recording area of the first recording layer using the test zone 11 is possible.

The test zone 11 can have a recording zone for a product inspection by a disk manufacturer. After a recording onto the recording zone, the optical disk has a partial recorded part. If the recording zone is large, as well as in known arts, the problem due to the border between the recorded part and the unrecorded part occurs. However, if the width of the recording zone is set, for example, less or equal to 10 percent of the condensed beam diameter, the change of the coherent light on another recording layer can be mostly ignored. Accordingly, there is no problem even if only this recording zone has already been recorded before a user uses the optical disk. In the above-described examples of numeric value, the width of the recording zone in the radius direction can be limited to less or equal to 3 μm.

In the case of the optical disk shown in FIG. 4 which has the area arrangement from the inner circumference to the outer circumference and data is sequentially recorded on the user data recording area on the zeroth recording layer from the inner circumference to the outer circumference and from the outer circumference to the inner circumference on the first recording layer, by the following recording procedure, a stable recording can be performed without effect from the border.

First, an optimization of recording condition is performed in the test zone 11 of the inner circumference control data recording area of the zeroth recording layer. Then, necessary control information is recorded in the other recording zone 12. Then, dummy data is recorded on the guard zone 10 of the inner circumference control data recording area. Finally, a recording is sequentially performed on the user data recording area in a direction to the outer circumference. During the recording, if necessary, a recording condition test in the test zone 11 of the inner circumference or the outer circumference, or, an additional recording of recording control data onto the other recording zone 12 is performed.

After all recordings onto the user data recording area of the zeroth recording layer are finished, dummy data is recorded onto the guard zone 10 of the outer circumference control data recording area of the zeroth recording layer. In this state, a recording onto the first recording layer is started for the first time. Then, because the test zone of the inner circumference or the outer circumference of the first recording layer has already been recordable through the recorded part of the zeroth recording layer, a recording condition test of the first recording layer can be performed at any time. Moreover, on the user data recording area of the first recording layer, similarly, a recording through the recorded part of the zeroth recording layer is possible.

After the above-described process, dummy data is recorded onto the guard zone of the outer circumference of the first recording layer and a recording onto the user data recording area is sequentially performed in a direction to the inner circumference. During the recording, if necessary, a recording of additional control information onto the other recording zone 12 can be performed.

When all user data recording areas on the first recording layer are recorded, a post-processing of recording is performed.

First, the rest of the test zone 11 in the inner circumference control data recording area of the zeroth recording layer and all (or almost all) of the unrecorded part of the other recording zone 12 are made to be recorded state. Then, dummy data is recorded onto the guard zone 10 of the inner circumference control data recording area of the first recording layer and the process is finished.

During the above-described recording process, the recording on one recording layer is always performed under the condition that the predetermined clearance value is ensured from the border between the recorded part and the unrecorded part of another recording layer, and stable recording can be realized.

In the other recording zone 12, a part can be left as unrecorded state. In this case, there is no effect to the recording operation of another recording layer if the width of the unrecorded area in the radius direction is narrow enough as well as in the case that the recording zone for an optical disk manufacturer is provided.

Figure 5:
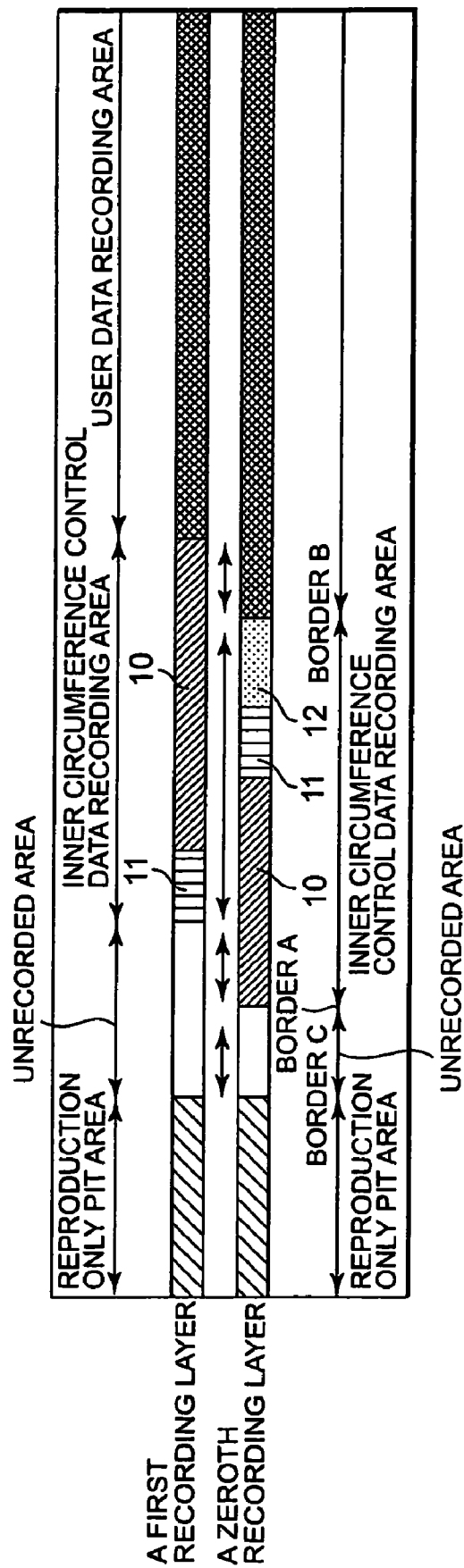
FIG. 5 is a view illustrating an example of format of an optical disk according to a second embodiment of the present invention.

With reference to FIG. 5, a format arrangement of an optical disk according to a second embodiment of the present invention is described. As well as shown in FIG. 4, in FIG. 5, the left-hand side is the inner circumference side and the right-hand side is the outer circumference side of the optical disk.

In FIG. 5, each recording layer, from the inner circumference side, has a reproduction only pit area, an unrecorded area, an inner circumference control data recording area, and a user data recording area.

Two borders of one recording layer, a border A which is between the unrecorded area and the inner circumference control data recording area and a border B which is between the inner circumference control data recording area and user data recording area, are arranged with a margin greater or equal to a predetermined clearance value against three borders of another recording layer, the border A, the border B, and a border C which is between the reproduction only pit area and the unrecorded area. The border C is between the reproduction only pit area and the unrecorded area also adversely affects to recording on another recording layer or reproduction of another recording layer as well as the border between the recorded area and the unrecorded area.

Two-way allows between the recording layers shown in the drawing denote distances with consideration of the clearance value. By such consideration, also, by the recording format shown in FIG. 5, recording or reproduction can be performed without effect to the track error by the coherent light.

Figure 6:
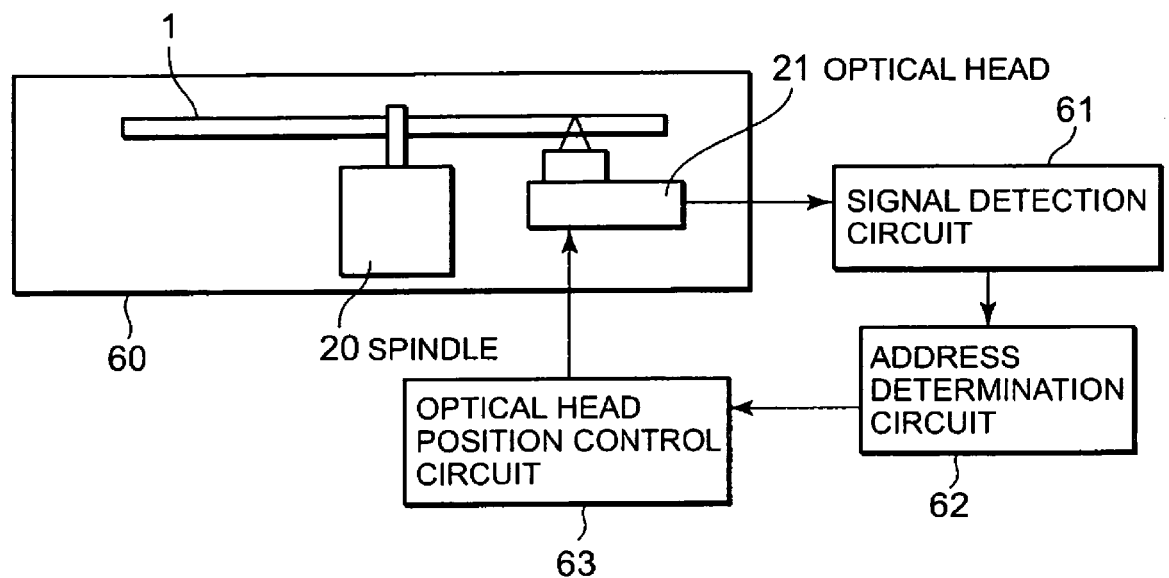
FIG. 6 is a view illustrating a configuration of a recording/reproducing optical disk apparatus according to a third embodiment of the present invention.
Figure 7:
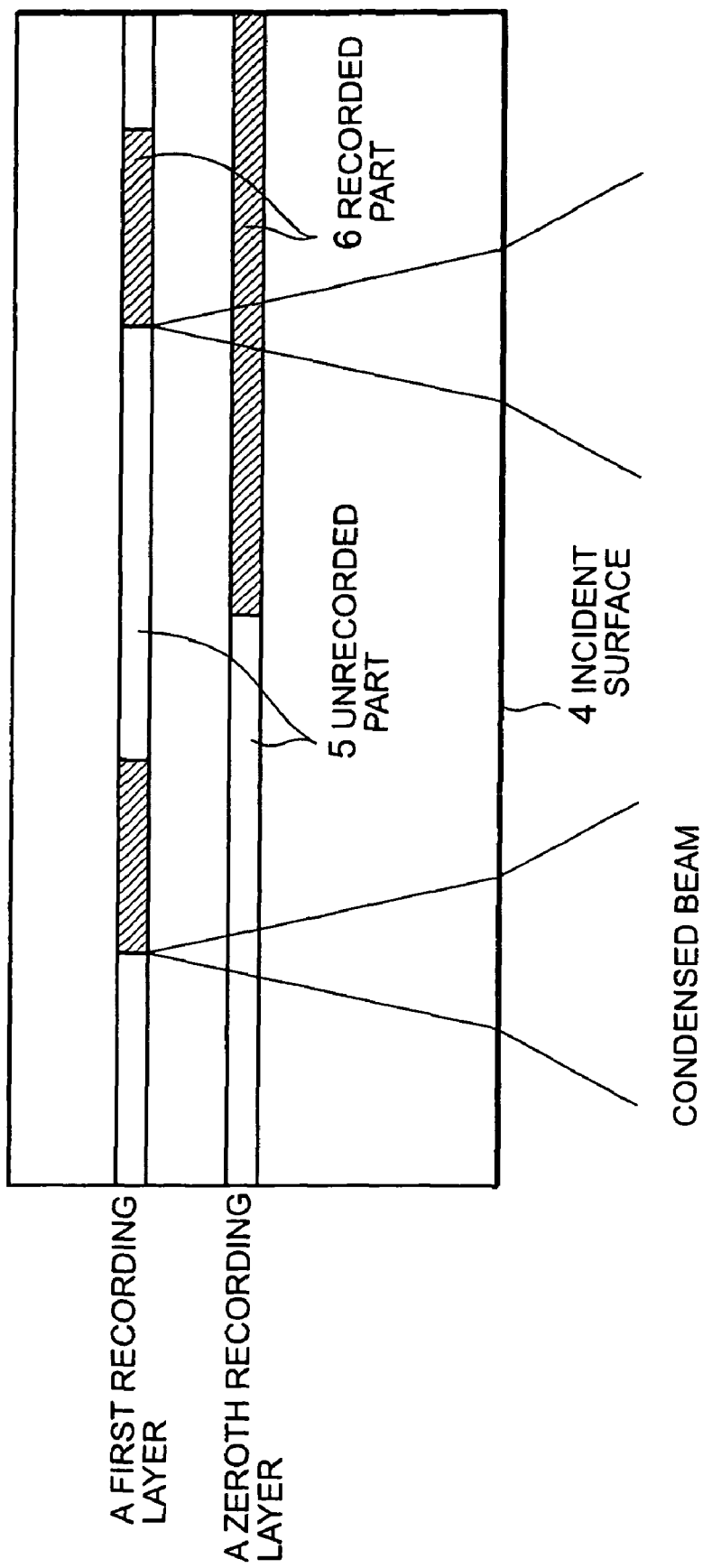
FIG. 7 is a view for explaining a problem of a known two-layer optical disk.

FIG. 6 is a view illustrating a structural example of a recording/reproducing optical disk apparatus according to a third embodiment of the present invention.

The optical disk apparatus has a driving mechanism 60, a signal detection circuit 61, an address determination circuit 62, and an optical head position control circuit 63. The driving mechanism 60 has a spindle 20 for rotatively driving an optical disk 1 and an optical head 21 for writing information onto the optical disk and reading the recorded information.

The optical disk apparatus records or reproduces a signal by the optical head 21 to the two-layer optical disk 1 set to the spindle 20. The reproduction signal from the optical head 21 is sent to the address determination circuit 62 through the signal detection circuit 61 and a current address position of the condensed beam is detected. By this operation, it is determined whether the condensed beam is within or without the clearance value where the condensed beam is affected by a coherent light from a different recording layer from the currently accessing recording layer, a necessary operation is determined, and position control of the optical head 21 is performed by the optical head position control circuit 63.

If an area to be accessed corresponds to a border between a recorded part and an unrecorded part of another recording layer in the manner the area across the border, in the vicinity of the border, by accessing using a method which does not need to use a track servo by a push-pull signal, stable operation can be realized.

If it is necessary to detect a signal from the recorded part in the corresponding area over the border of another recording part, tracking by different methods from the push-pull method, for example, a phase difference detection method which is less affected by imbalance of a reflected light is also effective.

As described above, the optical disk apparatus according to the present invention enables to perform stable recording or reproducing operation by performing the recording or reproducing operation on each recording layer by defining whether an address is within or without a predetermined clearance value against an address position of a border between a recorded part and an unrecorded part formed on another recording layer.

What is claimed is:

1. A two-layer optical disk comprising two recording layers on which a recordable spiral track is formed and recording or reproduction is performed through a transparent substrate from a same incident surface, each recording layer comprising a reproduction only pit area, an unrecorded area, an inner circumference control data recording area, and a user data recording area radially from an inner circumference side to an outer circumference side of the disc, wherein the inner circumference control data recording area of each recording layer comprises a test zone for checking a recording condition within the area and a guard zone, said test zone having a first inner circumferential address position and a first outer circumferential address position, said guard zone having a second inner circumferential address position and a second outer circumferential address position, said first inner circumferential address position of one of the two recording layers and said second inner circumferential address position of the other of the two recording layers being separated by a radial distance greater or equal to a predetermined clearance value, said first outer circumferential address position of one of the two recording layers and said second outer circumferential address position of the other of the two recording layers being separated by a radial distance greater or equal to the predetermined clearance value; and wherein each recording layer comprises a first border defined between the unrecorded area and the inner circumference control data recording area thereof and a second border defined between the reproduction only pit area and the unrecorded area thereof, the address position of the first border of one of the two recording layers and the address position of the second border of the other of the two recording layers being separated by a radial distance greater or equal to the predetermined clearance value.

2. The two-layer optical disk according to claim 1, wherein an interval between the two layers of recording layer is less than 40 μm and a NA of an optical head for recording data on the optical disk or reproducing the data from the optical disk is less or equal to 0.65.

3. The two-layer optical disk according to claim 1, wherein the guard zone on one of the recording layers near the incident surface is an area on which dummy data is recorded and the guard zone on the other of the recording layers is an area on which dummy data is recorded or no data is recorded.

* * * * *

UNITED STATES PATENT AND TRADEMARK OFFICE
CERTIFICATE OF CORRECTION

PATENT NO. : 7,835,256 B2
APPLICATION NO. : 11/519527
DATED : November 16, 2010
INVENTOR(S) : Yutaka Yamanaka et al.

Page 1 of 1

It is certified that error appears in the above-identified patent and that said Letters Patent is hereby corrected as shown below:

On the Title Page (73) Assignee: NEC Cirporation, Tokyo (JP) should read:

NEC CORPORATION, TOKYO (JP)

AND

KABUSHIKI KAISHA TOSHIBA, TOKYO (JP)

Signed and Sealed this
Twenty-fifth Day of January, 2011

David J. Kappos
*Director of the United States Patent and Trademark Office*